J. C. LAW.
DETACHABLE LINK CHAIN.
APPLICATION FILED JULY 1, 1918.
1,296,974.   Patented Mar. 11, 1919.
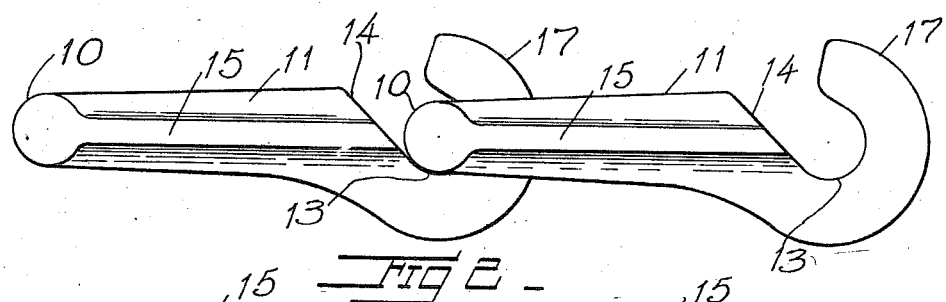
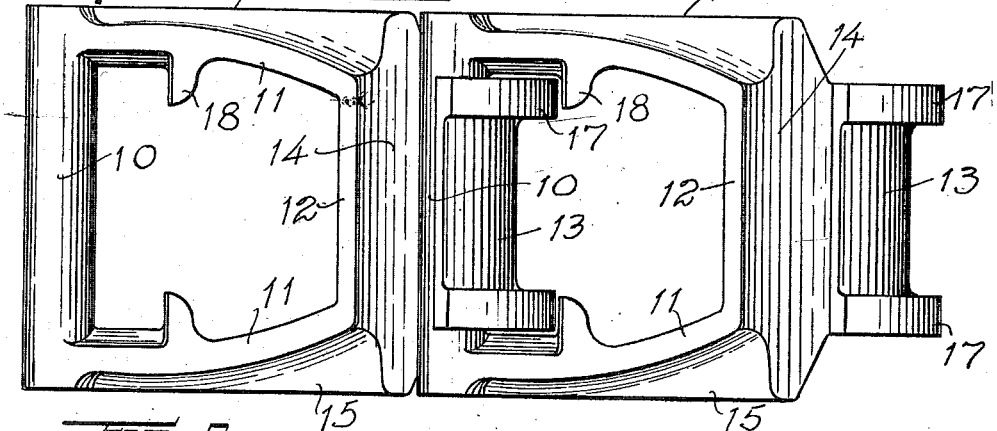
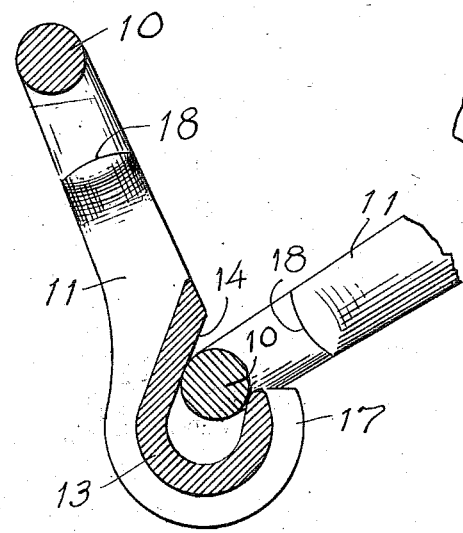
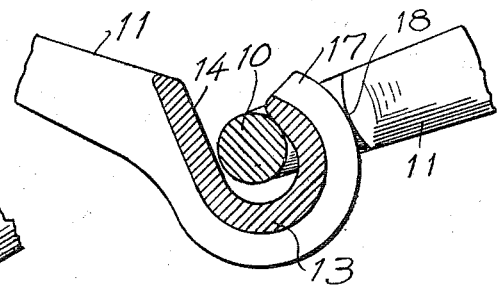
Inventor
James C. Law
By Watson E. Coleman
Attorney

UNITED STATES PATENT OFFICE.

JAMES CLARKSON LAW, OF CARBONDALE, PENNSYLVANIA.

DETACHABLE-LINK CHAIN.

1,296,974.   Specification of Letters Patent.   Patented Mar. 11, 1919.

Application filed July 1, 1918. Serial No. 242,791.

*To all whom it may concern:*

Be it known that I, JAMES C. LAW, a citizen of the United States, residing at Carbondale, in the county of Lackawanna and State of Pennsylvania, have invented certain new and useful Improvements in Detachable-Link Chains, of which the following is a specification, reference being had to the accompanying drawings.
This invention relates to chains made up of links such as are used as carriers, sprocket chains, drive chains and the like, and particularly to certain improvements in that form of chain wherein each link carries at one end a cross bar and at the opposite end a hook, the hook of one link engaging with the cross bar of the next adjacent link.

The general object of the invention is to improve upon the detailed form of the link to thereby secure additional rigidity and strength in the link.

A further object is to provide means which will cause the links to interlock with each other in all positions save one, and in this connection to provide inwardly projecting lugs on the side bars of the link which engage the hook of the next adjacent link and prevent the disengagement of the hook from the link, these lugs also acting as a guide for the flanges of a hook and as a fulcrum against which the hook bears when the linked belt or chain is slack.

Other objects will appear in the course of the following description.
My invention is illustrated in the accompanying drawing, wherein:—

Figure 1 is a side elevation of two connected links constructed in accordance with my invention;
Fig. 2 is a top plan view of the construction shown in Fig. 1;

Fig. 3 is a longitudinal section showing two links in the position taken when they are being connected; and Fig. 4 is a fragmentary longitudinal section showing the action of the links at the "slacking" point, that is, at the point at which the chain becomes slack.

Referring to these figures, it will be seen that each individual link is approximately rectangular in form and is preferably of cast metal. Each link comprises the cross bar 10, the side bars 11, the cross bar 12 and the hook 13. The cross bar 10 is circular in cross section and the side bars 11 extend slightly inward toward each other, as shown in Fig. 2, to the cross bar 12. This cross bar 12 has an inclined face 14 and the side bars are formed with longitudinally extending ribs 15 which intersect the cross bar 12.

Extending from the cross bar 12 is the hook-shaped web 13, the margins of which are formed with outwardly extending ribs or flanges 17 which merge into and form extensions of the side bars 11. These side bars 11 are formed with inwardly projecting lugs 18, those faces confronting the cross bar 10 being parallel to the cross bar, the opposite faces being inclined. The hook end 13 of the link extends through about three-fourths of a circle. The bill of each hook is deflected from a true circle and extends in slightly convergent relation to the inclined face 14 as shown clearly in Fig. 3, the mouth formed between the bill and the face 14 being just large enough to permit the entrance of the cross bar 10. The distance between the inner faces of the lugs 18 and the cross bar 10 is slightly greater than the thickness of the ribs 17 or flanges 17, so that when the links are consecutively connected, the lugs 18 will form a leverage, fulcrum and guide with relation to the faces of the flanges 17.

In the use of this link device when the links are to be coupled, they are held approximately at right angles to each other, the bar end of one link being inserted into the hooked end 13 of the next adjacent link, while the lugs 18 ride the faces of the flanges 17. Now when these links are brought into a horizontal position or on any straight stretch of chain, these lugs will prevent the detachment of one link from another by preventing the cross bar 10 of one link from riding up the inclined face 14 of the next adjacent link. This is particularly necessary where there is any slacking in the speed of the chain which causes the hook to release its pull or strain on the bar of the next adjacent link. Furthermore, when the chain is extending between chain sprockets and the chain is depressed at the slacking point midway between the chain sprockets, as illustrated in Fig. 4, the two links have an angular relation to the horizontal of about 7°. Such an angle represents the nearest approach to detachment while the chain is operating, and it is at this point that the links are most likely to become disengaged from each other. When in such operative position, the lug 18 bears against the face of flange 17, and the bar 10, when the links tend to "dish out", is forced up against the under part of the hook point, thereby forming a fulcrum. As the right hand link pushes upward, the tendency of this movement is to either come to a complete fulcrum or such right hand link will be forced downward. At this point, the lugs 18 always prevent the bar 10 from slipping out of the opening between the bill or point of the hook and the face 14. This fulcruming action is only secured when the links reach the point of "dishing out" where the links are disposed at an angle of about 7° to a horizontal plane and any twisting of the links relative to each other at this point also causes the lugs to bind upon the flanges 17, thus holding the links from detachment. From this point, the links may change their angular relation to each other until they are at right angles downward, without any chance of detachment.

It will thus be seen that this chain will remain securely locked at all times and that, therefore, it may be used as a drive, a conveyer, an elevator chain or a carrier chain, without any chances of the links becoming disconnected. The links may be readily connected to each other by disposing the links at right angles with the bar of one link in the hook of the other link and then turning one link downward directly over the other, and they may be detached by reversing said movement but they are not liable to become detached when in operation with the proper and normal adjustment of the chain take-up. It is to be particularly noted that in my link, the side bars 11 of the link are a full cross section for their entire length and that these side bars at their point of intersection with the cross bar 10 are not reduced in thickness or depth for the purpose of connecting the link to the hook. This reduction in cross section of the side bar at this point has always been a weak point of links of the general character stated by me and it has always been at this point that fracture in the links occurs.

It is to be understood that the links illustrated are designed to carry attachments of one kind or another, as for instance buckets or the like, these attachments forming an integral part of the links, and, therefore, it is particularly necessary that the links should engage with each other when the links are at right angles, or less, as, if it is necessary to bend the links over to more acute angles in order to engage them, it would be impossible to connect the links with certain attachments thereon.

Having described my invention, what I claim is:

A chain comprising a series of links, each having side bars and opposite end bars, one of said end bars being cylindrical and the other end bar being formed with a hook projecting therefrom, the face of the last named end bar being inclined and merging into the hook to provide an opening between the bill of the hook and the face of the end bar extending at an angle to the plane of the link, the extremity of the hook being spaced from said inclined face a distance slightly greater than the diameter of the cylindrical end bar of a coacting link, the hook having marginal outwardly extending flanges and the side bars being formed with inwardly projecting lugs spaced from the cylindrical end bar a distance slightly greater than the depth of the flanges, the lugs extending over the outer faces of said flanges to thereby prevent the detachment of one link from another until the lugs of one link are disposed beyond the extremity of the hook of the engaged link.

In testimony whereof I hereunto affix my signature in the presence of two witnesses.

JAMES CLARKSON LAW.

Witnesses:
J. F. WHEELER,
ARTHUR R. FOOTE.

Copies of this patent may be obtained for five cents each, by addressing the "Commissioner of Patents, Washington, D. C."